Feb. 24, 1970   ISUKE IMADA   3,497,522
MONODEMETHYL COENZYME $Q_7$

Filed Jan. 20, 1967   3 Sheets-Sheet 1

Isuke Imada, Inventor

Feb. 24, 1970  ISUKE IMADA  3,497,522
MONODEMETHYL COENZYME $Q_7$
Filed Jan. 20, 1967  3 Sheets-Sheet 2
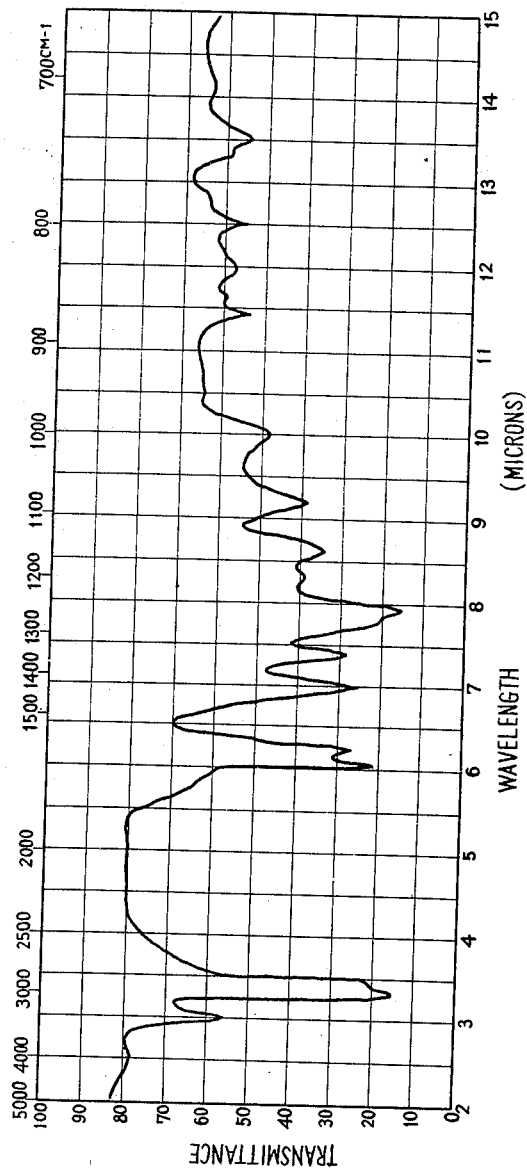
Fig-2-
Isuke Imada, Inventor
By Wenderoth, Lind and Ponack,
Attys.

Isuke Imada, Inventor

United States Patent Office 3,497,522
Patented Feb. 24, 1970

3,497,522
MONODEMETHYL COENZYME $Q_7$
Isuke Imada, Tobushi Ibaraki, Japan, assignor to Takeda Chemical Industries, Ltd., Osaka, Japan
Continuation-in-part of application Ser. No. 307,612, Sept. 9, 1963. This application Jan. 20, 1967, Ser. No. 622,842
Int. Cl. C07c 49/64, 39/18; B01i 1/10
U.S. Cl. 260—396                           2 Claims

ABSTRACT OF THE DISCLOSURE

A product is provided which is an isomeric mixture of monodemethyl coenzyme $Q_7$. The quinone and hydroquinone forms of the isomeric mixture are provided. A process for the preparation of isomeric mixtures of monodemethyl coenzyme $Q_n$ is also provided. Coenzyme $Q_n$ is irradiated with artificial or non-artificial light and the irradiation is interrupted when the amount of illumination is in the range between $350 \times 10_3$ and $3000 \times 10_3$ lux/hour.

---

Figure 1:
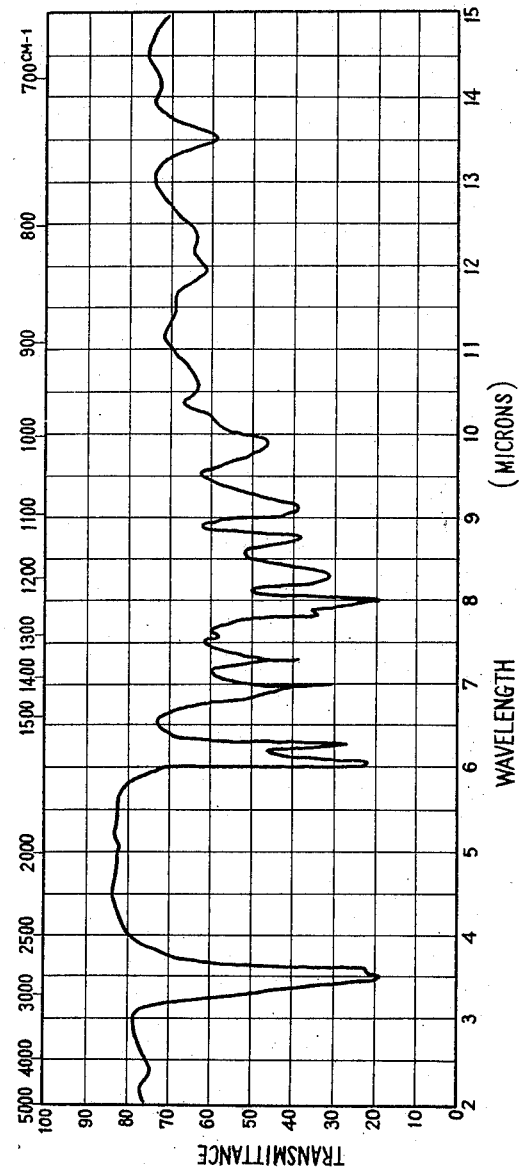

This application is a continuation-in-part of application Ser. No. 307,612, filed Sept. 9, 1963 and now abandoned.

This invention relates to an isomeric mixture of monodemethyl coenzyme $Q_7$, which is represented (in the oxidized form) by the formula

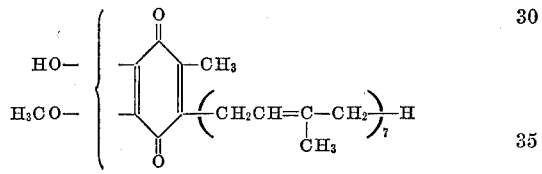

which isomeric mixture has the following properties:

*Analysis* (percent).—C, 79.71; H, 10.02; —$OCH_3$ by Zeisel's method: 4.75; molecular weight (by Barger's method): 626±25;

Ultraviolet spectrum absorption:

Oxidized form: $\lambda^{ethanol}_{maximum}$ 275 $m\mu$ ($E^{1\%}_{1\,cm.} = 133$)

$\lambda^{ethanol}_{minimum}$ 240 $m\mu$ ($E^{1\%}_{1\,cm.} = 39$)

Reduced form: $\lambda^{ethanol}_{maximum}$ 350 $m\mu$ ($E^{1\%}_{1\,cm.} = 51$)
↓
295 $m\mu$ ($E^{1\%}_{1\,cm.} = 37$)

Infrared spectrum absorption:

$\nu^{Liquid}_{maximum}$ cm.$^{-1}$: 3350 (due to hydroxyl group); 1665, 1610 (due to quinone); 1258, 1207, 1150, 1093 (due to methoxyl group).

The invention also relates to the reduced form of said isomeric mixture of monodemethyl coenzyme Q.

The invention is further concerned with a method for the preparation of isomeric mixtures of monodemethyl coenzyme Q of the general formula

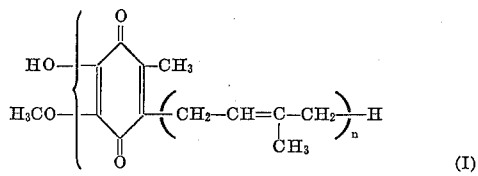
(I)

wherein $n$ is an integer of from 1 to 10. (This significance of $n$ is retained throughout this specification.) This method comprises irradiating coenzyme Q—hereinafter referred to as Co Q—with artificial or non-artificial light until monodemethyl coenzyme Q of Formula I is produced.

When used in the instant specification and claims, the term "isomeric mixture" is intended to specify the presence in the mixture of each of the specific isomeric variants encompassed by the generic formula set forth wherein the value of $n$ is fixed at a given value. For example, when the value of $n$ is 7, the isomeric variants are as follows:

A.

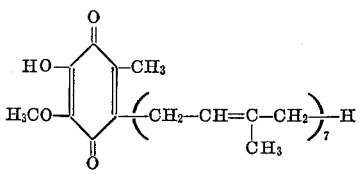

and

B.

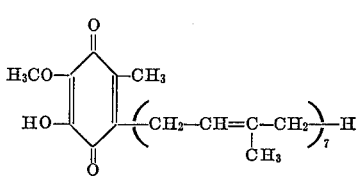

Upon reduction of the quinone, i.e.

form of the isomeric mixture the corresponding isomeric mixture in the hydroquinone, i.e.

form is produced and is referred to herein as the hydroquinone form of the isomeric mixture of the monodemethyl coenzyme Q.

It was generally considered that Co Q was inactivated by irradiation with light. However, according to the present invention, the photochemical reaction of Co Q is utilized to produce a relatively stable substance having a biological activity by interrupting such reaction, e.g. by discontinuing the irradiation, at an appropriate time, whereby formation of all inactive reaction product is excluded.

The thus-produced active substance is represented by the aforesaid Formula I wherein $n$ represents an integer of from 1 to 10.

An object of this invention is thus to obtain an isomeric mixture of monodemethyl coenzyme $Q_7$. Another object is to provide a method for preparing isomeric mixture of monodemethyl coenzyme Q having the general Formula I wherein $n$ represents an integer from 1 to 10.

The isomeric mixture of monodemethyl Co Q has relatively strong biological activity; this activity is particularly strong in lower concentrations. For example, the activity of the isomeric mixture of monodemethyl Co $Q_7$ is as shown in Table I, wherein the restoration of the activity of succinoxidase is measured by the method of R. L. Lester et al.:

As the activity of the isomeric mixture of monodemethyl Co Q on succinoxidase is inhibited completely with e.g. antimycin A, one of the specific inhibitors of reduced coenzyme Q-cytochrome C reductase, this isomeric mixture of monodemethyl Co Q is indicated as

TABLE I[1]

| Enzyme | Lyophilized mitochondria | Mitochondria treated with acetone | | | | | | |
|---|---|---|---|---|---|---|---|---|
| | | None | Co $Q_7$ | | | Isomeric Mixture of Monodemethyl Co $Q_7$ | | |
| Addition | None | None | 75γ | 150γ | 200γ | 100γ | 150γ | 200γ | 200γ[2] |
| Activity [3] | 0.44 | 0.05 | 0.06 | 0.15 | 0.19 | 0.22 | 0.21 | 0.21 | 0.01 |

[1] The oxidation of succinate by oxygen is measured at 37.5° C. by means of Warburg apparatus. The complete system contains 150 μmole of Na-succinate, 1 milliliter of 0.1 M phosphate buffer of pH 7.5, 1.4 milligrams of enzyme protein, 0.1 milliliter of 2% cytochrome C, and 0.25 M sucrose to a final volume of 3 milliliters.
[2] In this case antimycin A (100γ) is further added.
[3] Specific activity is represented by microatoms of oxygen consumed per one minute per one milligram of enzymatic-protein.

The product obtained by the method of this invention is positive to the $FeCl_3 \cdot K_3Fe(CN)_6$—, magnesium acetate-, and leucomethylene blue-reactions. When acetylated with acetic anhydride and pyridine, the product gives an acetyl derivative which shows no absorption due to OH and exhibits a new absorption at 1790 cm.$^{-1}$, 1190 cm.$^{-1}$ due to $CH_3CO$, in the infrared spectrum. Further, the reduced or hydroquinone form of the product is positive to the neotetrazolium reaction. These results indicate the product to be the demethylated form of Co Q. This is confirmed by methylation of the product to Co Q with dimethylsulfate and anhydrous potassium carbonate. It is apparent that the product is a mixture of the possible isomers.

Figure 4:
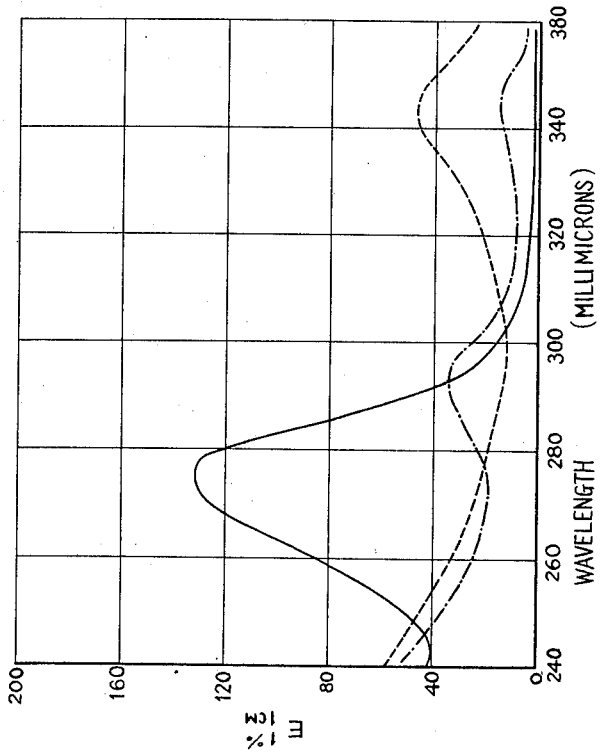
Figure 3:
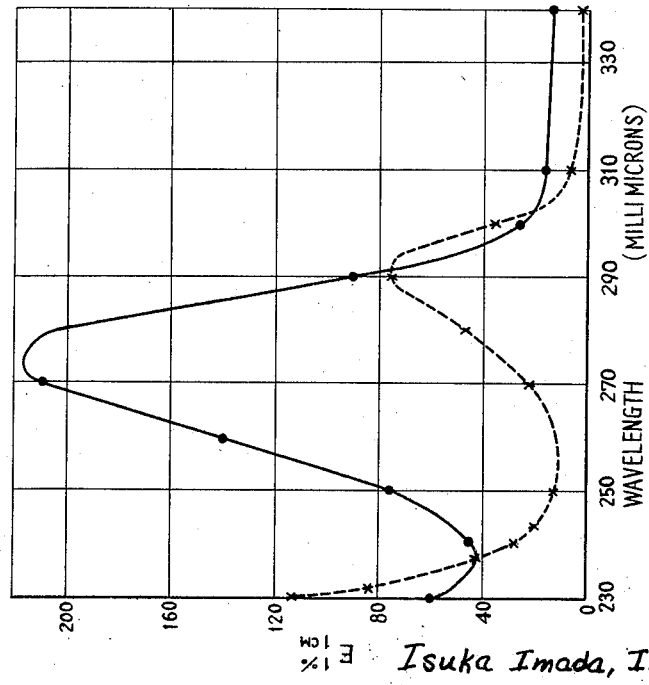

FIGS. 1 and 2 show the infrared absorption spectrum of Co $Q_7$ and of the isomeric mixture of monodemethyl Co $Q_7$ (cm. Example 1), respectively. FIGS. 3 and 4 show the ultraviolet absorption spectrum of Co $Q_7$ and of isomeric mixture of monodemethyl Co $Q_7$, respectively, wherein a solid line shows oxidized form, a dotted line shows a form right after the completion of reduction, and a chain line shows a form 30 minutes after the completion of reduction. As shown in FIGS. 1 and 2, while the isomeric mixture of monodemethyl Co $Q_7$ has a specific absorption band at 3350 cm.$^{-1}$ due to OH, Co $Q_7$ has no such absorption band in the infrared spectrum. Further, as shown in FIGS. 3 and 4, while the reduced form of Co $Q_7$ has maximum absorption at 290 mμ in ultraviolet absorption, in the reduced form of the isomeric mixture of monodemethyl Co $Q_7$ the maximum absorption band appears at about 350 mμ which moves to 295 mμ with lapse of time.

The nuclear magnetic resonance spectrum of the isomeric mixture of monodemethyl Co $Q_7$ is as shown in Table II:

TABLE II

| Proton type | (1) | Relative band areas | Number of protons based on 1 $CH_3O$/ mole | Number of protons calcd. for $C_{43}H_{64}O_4$ and structure I |
|---|---|---|---|---|
| H$\overset{\mid}{C}$= | 4.9–5.0 | 217 | 7 | 7 |
| $CH_3O$— | 6.0 | 92 | 3 | 3 |
| =C—$CH_2$—CH= | 6.7–6.9 | 71 | 2 | 2 |
| =$\overset{\mid}{C}$—$CH_2$— | | | | |
| $CH_3\overset{\mid}{C}$= (nucleus) | 7.9–8.0 | 913 | 30 | 28 |
| OH | | | | |
| $CH_3\overset{\mid}{C}$= (chain) | 8.3–8.4 | 779 | 25 | 24 |

(1) The bands refer to 60 Mc. Spectra in carbon tetrachloride, using tetramethylsilane as an internal standard.

acting on oxidation-reduction system contained cytochromes in mitochondria.

Oxidized or quinone form of the isomeric mixture of monodemethyl Co Q may be converted into reduced or hydroquinone form of the isomeric mixture of monodemethyl Co Q due to its quinone skeleton. This can be accomplished in the manner known for Co Q.

The method of this invention comprises subjecting Co Q (or, as it may also be termed Co $Q_n$) to irradiation with artificial or non-artificial light until the isomeric mixture of the respective monodemethyl Co Q (or Co $Q_n$) is produced. As the starting material of this invention, Co $Q_n$ is employed. As the Co Q, there may be employed not only the crystalline form but also molten Co Q, fluid extract of Co Q-containing-substance, e.g. yeast extract, etc., solution of Co Q in suitable solvents, e.g. solution of Co Q in alcohol, hydrocarbon, acetone, chloroform, ester, etc.

In the method of this invention, any kind of light may be employed. For example, sunlight, monochromatic light such as ultraviolet rays may preferably be employed. Generally, the irradition is carried out at room temperature with stirring or statically. However, if necessary, it may be carried out under heating or cooling. Irradiation of light is continued until the isomeric mixture of monodemethyl Co Q is produced. It may be carried out successively or intermittently. Amount of light irradiated depends on such conditions as kind of light source, the method of irradiation, purity and condition of Co Q, etc. For example, when Co $Q_7$ dissolved in ethanol is irradiated with sunlight, the amount of the isomeric mixture of monodemethyl Co $Q_7$ is as shown in Table III:

TABLE III

| | Co $Q_7$, percent | Isometric mixture of Monodemethyl Co $Q_7$,[b] percent |
|---|---|---|
| The amount of light [a] (lux/hour): | | |
| 0 | 100 | 0 |
| 1,500×10³ | 62 | 11 |
| 3,000×10³ | 42 | 16 |

[a] The amount of light is estimated with Matsuda Sekisan Nishyo Kei IL–I–A (Matsuda's integrating type heliograph IL–I–A).
[b] Isometric mixture of monodemethyl Co $Q_7$ is estimated by means of Florisil column chromatography.

Further when Co $Q_7$ dissolved in methanol is irradiated with a mercury lamp, the isometric mixture of monodemethyl Co $Q_7$ is produced in the amounts shown in Table IV:

TABLE IV

| | Irradiation time, hours | Co $Q_7$, percent | Isometric mixture of Monodemethyl Co $Q_7$, percent |
|---|---|---|---|
| The amount of light (lux/hour): | | | |
| 350×10³ | 6 | 90 | 0.3 |
| 750×10³ | 13 | 79 | 0.9 |
| 1,020×10³ | 18 | 38 | 1.4 |
| 1,550×10³ | 27 | 36 | 2.6 |
| 1,800×10³ | 32 | 20 | 1.6 |
| 2,030×10³ | 37 | 13 | 1.7 |

The end point of the reaction can be determined by examining photochemical reaction product by e.g. reversed phase paper chromatography, column chromatography, ultraviolet absorption.

As the isomeric mixture of monodemethyl Co Q thus produced is generally contaminated with mixtures of photochemical reaction products of various processes, it may be preferable to subject thus prepared isomeric mixture to a separation process. For example, the isomeric mixture of monodemethyl Co Q may preferably be separated from contaminants through column chromatography, counter current distribution, etc. As the adsorbent of the column chromatography, there may, for example, be employed alumina, silicic acid, silicic acid salt, active charcoal, filter paper, etc. When the monodemethyl Co Q isomeric mixture is subjected to separation from impurities including non-reactants by means of silicic acid column chromatography, monodemethyl Co Q isomeric mixture can be eluted at a certain fraction by increasing concentration of polar solvent in non-polar solvent. For example, when a mixture of hexane and chloroform is employed, the isomeric mixture of monodemethyl Co Q is eluted at a fraction wherein the content of chloroform relative to hexane is 10-20% by volume.

When magnesium silicate column chromatography is employed, polar solvent, e.g. methanol is employed as eluant. Also, when the separation of the isomeric mixture of monodemethyl Co Q is carried out with counter current distribution, there may, for example, be employed lower alcohol and hydrocarbons such as normal hexane, isooctane as an eluant. Then, if necessary, thus eluted monodemethyl Co Q isomer mixture may be crystallized from a suitable organic solvent such as methanol, ethanol, etc.

The following examples are given for the purpose of illustrating presently preferred embodiments of this invention, although they are not intended to constitute a restriction or limitation of the scope of this invention. And it should be understood that any modification and any variation of the method substantially described in the foregoing description as well as in the appended claims are encompassed in the scope of this invention. In the examples, "mg.," "ml." and "cm." are the abbreviations of "milligrams," "milliliters" and "centimeters."

EXAMPLE 1

A solution obtained by dissolving 500 mg. of crystalline Co $Q_7$ in 50 ml. of ethanol is exposed directly to the sunlight 8 hours per day for 3 days, followed by evaporation to dryness under reduced pressure at a temperature at 40° C. or below; a small amount of normal hexane is then added. The solution is flown into a column (2×25 cm.) packed with silicic acid-diatomaceous earth (Hyflo Super-Cel) (2:1) as the adsorbent, followed by development with normal hexane to give stratum-wise yellow, orange, violet and brown bands. Each band of the resulting chromatograms is eluted successively with a corresponding mixture solution of hexane and chloroform for obtaining the respective fraction. The fraction corresponding to violet bands, and eluted with normal hexane-chloroform (10:1), is concentrated to dryness to obtain 104 mg. of oily crude monodemethyl Co $Q_7$ product. The product consisted of a mixture of the possible isomers. The thus-obtained crude monodemethyl Co $Q_7$ isomeric mixture is dissolved in normal hexane, followed by adsorption on a column of magnesium silicate, 60-100 mesh (Florisil). After removing impurities by washing the column with hexane-ethanol (1:1), pure isomeric mixture of monodemethyl Co $Q_7$ is eluted with methanol and subjected to crystallization to obtain orange red crystals of isomeric mixture monodemethyl Co $Q_7$. Melting point 37-39° C.

Analysis (percent).—Calculated for $C_{43}H_{64}O_4$: C, 80.12; H, 9.95; —$OCH_3$, 4.81. Found: C, 79.71; H, 10.12; —$OCH_3$, 4.75.

EXAMPLE 2

A solution obtained by dissolving 500 mg. of crystalline Co $Q_7$ in 100 ml. of methanol is irradiated with a mercury lamp for 9 hours with stirring, followed by concentration to dryness under reduced pressure at 40° C. (or below). The resultant irradiated solution is then adsorbed on a column of silicic acid-diatomaceous earth (Hyflo Super-Cel) (2:1), followed by development with normal hexane. The fraction corresponding to the violet band is eluted with a mixture of normal hexane and chloroform (10:1), followed by concentrating to dryness under reduced pressure. Column chromatography is repeated on the resultant material to obtain 50 mg. of oily isomeric mixture of monodemethyl Co $Q_7$. Thus obtained isomeric mixture of monodemethyl Co $Q_7$ is treated in the same way as in Example 1 to refine it into crystalline, orange red isomeric mixture of monodemethyl Co $Q_7$.

EXAMPLE 3

Fluid extract (ethanolic) of Co $Q_7$ obtained from dried mycelium of Torula utilis is concentrated to dryness under reduced pressure, followed by the addition of ethanol. The solution is exposed to direct sunlight for 2 days, and then the solvent is removed under reduced pressure. The residue is dissolved in a small amount of normal hexane, and the solution is then adsorbed on a column of Florisil (magnesium silicate). After removing the remaining Co $Q_7$ with mixtures of normal hexane and chloroform (1:1), methanol is added to elute an isomeric mixture of monodemethyl Co $Q_7$. After the eluate is adjusted to acidity, normal hexane is added to obtain crude oily isomeric mixture of monodemethyl Co $Q_7$. Thus obtained isomeric mixture of monodemethyl Co $Q_7$ is treated in the same way as in Example 1 to refine it into crystalline isomeric mixture of monodemethyl Co $Q_7$.

The isomeric mixtures of monodemethyl derivatives of another kind of Co $Q_n$, e.g. Co $Q_1$, Co $Q_2$, Co $Q_3$, Co $Q_4$, Co $Q_5$, Co $Q_6$, Co $Q_8$, Co $Q_9$ and Co $Q_{10}$, are prepared in substantially the same way as above.

The isomeric mixtures of demethylated Co $Q_n$ derivatives of the present invention, especially the demethylated Co $Q_7$, are useful as an agent of preventing or curing, for example, "stress' usually accompanied by e.g. administration of antibacterial or antiparasitic substances.

The isomeric mixtures of monodemethyl Co $Q_n$ are additionally useful as intermediates in the preparation of compounds of the formula

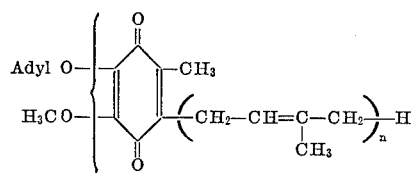

and the reduced or hydroquinone form thereof wherein acyl represents a carboxylic acid acyl group, preferably the residue of a lower alkane monocarboxylic acid, e.g. acetic, propionic, butyric and valeric acids. The following example is illustrative of the utilization of the isomeric mixture of monodemethyl Co $Q_7$ in the preparation of the isomeric mixture of corresponding acetyl derivative.

EXAMPLE 4

To 129 mg. of the isomeric mixture of monodemethyl Co $Q_7$ such as obtained in Example 1 is added 0.8 cc. of acetic anhydride and 0.8 cc. of pyridine. The mixture is allowed to stand for 6 hours at room temperature. The mixture is then poured into ice water and extracted with 50 cc. of n-hexane. The hexane solution is then washed with 30 cc. of 3 N-sulfuric acid, 30 cc. of 5% aqueous sodium hydrogen carbonate solution, and with 30 cc. of water. After dehyderation, the solvent is evaporated to leave an orange-colored oily residue. The residue is chromatographically purified by the use of a column (2×5 cm.) packed with 5 g. of silicic acid Hyflo Super-Cel (1:1). An oily eluate is obtained by eluting the column with a mixture of n-hexane and chloroform (4:1 by volume). The oily eluate is crystallized from a small amount of methanol to obtain a mixture of the acetates of monodemethyl Co $Q_7$. The yield is 78 mg. (57% of theory). Yellow needles are obtained which melt at 18 to 21° C.

UV maximum: $E^{1\%}_{1cm.}$: Oxidized form 273 m$\mu$ (178).
Reduced form 354 ⟶ 295 m$\mu$.

IR-Absorption: 1180, 1780 cm.$^{-1}$ ($CH_3CO$—).

Elementary analysis (percent).—Calculated for

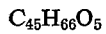

(M.W.=686.9): C, 78,67; H, 9.68. Found: C, 79.00; H, 9.57.

The acyl derivatives are useful for investigation of the relationship between the enzymatic activity and the structure of Co Q.

The isomeric mixtures of monodemethyl Co $Q_n$ are useful also as intermediates in the preparation of radioactive Co $Q_n$ of the formula

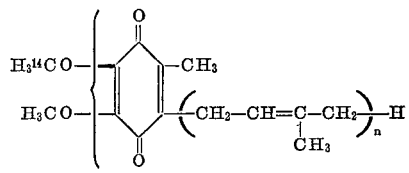

The radioactive Co $Q_n$ are applied for the investigation of role of Co Q in vivo.

EXAMPLE 5

A solution of the isomeric mixture of monodemethyl Co $Q_7$ (87 mg.) in acetone (8 ml.) is refluxed at 70° C. for 1 hour with anhydrous potassium carbonate (500 mg.) and methyl iodide-$^{14}$C (0.7 ml.), when the color of the reaction mixture changes from orange via deep violet to yellow. The solvent is evaporated and the residue is dissolved in hexane and adsorbed on a column packed with Forisil (10 g.).

The column is eluted with hexane-chloroform (8:2) and the oily substance obtained by subjecting the eluate to evaporation is dissolved in a little ethanol and kept in a cool place to separate yellow plates. The yield is 58 mg. (65% of theory).

Having thus disclosed the invention what is claimed is:

1. A product selected from the group consisting of (a) an isometric mixture of monodemethyl coenzyme $Q_7$ of the formula

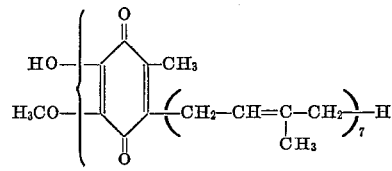

and has the following properties:

Analysis (percent).—C, 79.71; H, 10.02; —$OCH_3$ by Zeisel's method: 4.75; molecular weight (by Barger's method): 626±25;

Ultraviolet spectrum absorption—

Oxidized form: $\lambda^{ethanol}_{maximum}$ 275 m$\mu$ ($E^{1\%}_{1cm.}$=133)

$\lambda^{ethanol}_{minimum}$ 240 m$\mu$ ($E^{1\%}_{1cm.}$=39)

Reduced form: $\lambda^{ethanol}_{maximum}$ 350 m$\mu$ ($E^{1\%}_{1cm.}$=51)
↓
295 m$\mu$ ($E^{1\%}_{1cm.}$=37)

Infrared spectrum absorption—

$\nu^{Liquid}_{maximum}$ cm.$^{-1}$: 3350 (due to hydroxyl group); 1665, 1610 (due to quinone); 1258, 1207, 1150, 1093 (due to methoxyl group), and (b) its hydroquinone form.

2. An isomeric mixture of monodemethyl coenzyme $Q_7$ of the formula

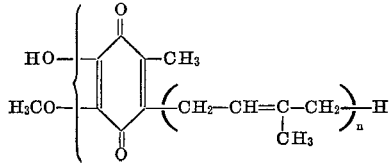

and having the following properties:

Analysis (percent).—C, 79.71; H, 10.02; —$OCH_3$ (by Zeisel's method: 4.75; Molecular weight by Barger's method): 626±25

Ultraviolet spectrum absorption—

Oxidized form: $\lambda^{ethanol}_{maximum}$ 275 m$\mu$ ($E^{1\%}_{1cm.}$=133)

$\lambda^{ethanol}_{minimum}$ 240 m$\mu$ ($E^{1\%}_{1cm.}$=39)

Reduced form: $\lambda^{ethanol}_{maximum}$ 350 m$\mu$ ($E^{1\%}_{1cm.}$=51)
↓
295 m$\mu$ ($E^{1\%}_{1cm.}$=37)

Infrared spectrum absorption—

$\nu^{Liquid}_{maximum}$ cm.$^{-1}$: 3350 (due to hydroxyl group); 1665, 1610 (due to quinone); 1258, 1207, 1150, 1093 (due to methoxyl group).

References Cited

UNITED STATES PATENTS 3,068,295   12/1962   Folkers et al. _____ 260—396

LORRAINE A. WEINBERGER, Primary Examiner

L. ARNOLD THAXTON, Assistant Examiner

U.S. Cl. X.R.

204—158; 260—613